US 8,436,576 B2

(12) United States Patent
Toya et al.

(10) Patent No.: US 8,436,576 B2
(45) Date of Patent: May 7, 2013

(54) SUBSTITUTE BATTERY PACK INCLUDING A CASE TO ACCOMMODATE A SMALLER BATTERY TYPE WITH AN INDUCTION COIL TO FACILITATE CHARGING

(75) Inventors: Shoichi Toya, Minamiawaji (JP); Toshiki Nakasho, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 175 days.

(21) Appl. No.: 12/385,833

(22) Filed: Apr. 21, 2009

(65) Prior Publication Data

US 2009/0267560 A1     Oct. 29, 2009

(30) Foreign Application Priority Data

Apr. 24, 2008    (JP) .................................. 2008-114590

(51) Int. Cl.
     *H02J 7/00*        (2006.01)
(52) U.S. Cl.
     USPC ........................................................ 320/108
(58) Field of Classification Search ................ 320/108, 320/115
See application file for complete search history.

(56) References Cited

U.S. PATENT DOCUMENTS

| | | | | |
|---|---|---|---|---|
| 3,885,211 | A | * | 5/1975 | Gutai ............................ 320/108 |
| 4,206,274 | A | * | 6/1980 | Peels ............................. 429/99 |
| 4,532,194 | A | * | 7/1985 | Liautaud et al. ................. 429/99 |
| 5,246,790 | A | * | 9/1993 | Mooney et al. .................... 429/7 |
| 5,506,488 | A | * | 4/1996 | Leiserson ..................... 320/112 |
| 5,508,123 | A | * | 4/1996 | Fan ................................. 429/96 |
| 5,733,674 | A | * | 3/1998 | Law et al. ........................ 429/9 |
| 6,016,046 | A | * | 1/2000 | Kaite et al. .................... 320/108 |
| 6,208,115 | B1 | * | 3/2001 | Binder .......................... 320/108 |
| 6,395,980 | B2 | * | 5/2002 | Iitsuka ............................ 174/50 |
| 6,531,244 | B1 | * | 3/2003 | Ryan et al. .................... 429/100 |
| 7,830,116 | B2 | * | 11/2010 | Toya et al. .................... 320/108 |
| 7,863,860 | B2 | * | 1/2011 | Lin ............................... 320/108 |
| 8,115,447 | B2 | * | 2/2012 | Toya et al. .................... 320/108 |
| 2002/0113572 | A1 | * | 8/2002 | Zink et al. ..................... 320/108 |

(Continued)

FOREIGN PATENT DOCUMENTS

| | | |
|---|---|---|
| JP | 2-124601 | 10/1990 |
| JP | 6-46531 | 2/1994 |

(Continued)

*Primary Examiner* — Yalkew Fantu
*Assistant Examiner* — Manuel Hernandez
(74) *Attorney, Agent, or Firm* — Wenderoth, Lind & Ponack, L.L.P.

(57) ABSTRACT

A battery pack, instead of size AA batteries, is loaded in a battery storage compartment of an electronic device. The battery pack includes a battery casing, a plurality of size AAA batteries, a battery holder, a circuit board, and an induction coil electromagnetically connected to a primary coil of a battery charger cradle. The size AAA batteries are accommodated in the battery casing in a spaced-apart manner where a distance between longitudinal axes of the size AAA batteries is larger than a distance between longitudinal axes of the size AA batteries loaded in the battery storage compartment, and a storage space is defined between the adjacent size AAA batteries. With an electronic component, mounted on the circuit board, being disposed in the storage space, the battery pack accommodates the size AAA batteries, the battery holder, the circuit board, and the induction coil in a mutually layered state in the battery casing.

26 Claims, 12 Drawing Sheets

U.S. PATENT DOCUMENTS

| | | | |
|---|---|---|---|
| 2003/0048095 A1* | 3/2003 | Zink et al. | 320/108 |
| 2004/0067411 A1* | 4/2004 | Lisanke | 429/90 |
| 2004/0229119 A1* | 11/2004 | Lin et al. | 429/164 |
| 2009/0001931 A1* | 1/2009 | Lin | 320/108 |
| 2009/0267559 A1* | 10/2009 | Toya et al. | 320/108 |
| 2012/0105000 A1* | 5/2012 | Toya et al. | 320/108 |
| 2012/0262109 A1* | 10/2012 | Toya et al. | 320/108 |
| 2012/0299396 A1* | 11/2012 | Baden et al. | 307/149 |
| 2013/0038278 A1* | 2/2013 | Park et al. | 320/108 |

FOREIGN PATENT DOCUMENTS

| | | |
|---|---|---|
| JP | 3011829 | 6/1995 |
| JP | 3021847 | 3/1996 |
| JP | 9-63655 | 3/1997 |
| JP | 10-308200 | 11/1998 |
| JP | 2001-76699 | 3/2001 |
| JP | 2001-85068 | 3/2001 |
| JP | 2008-235022 | 10/2008 |

* cited by examiner

SUBSTITUTE BATTERY PACK INCLUDING A CASE TO ACCOMMODATE A SMALLER BATTERY TYPE WITH AN INDUCTION COIL TO FACILITATE CHARGING

BACKGROUND OF THE INVENTION

1. Field of the Invention

The present invention relates to a battery pack incorporating an induction coil electromagnetically coupled to a primary coil in a battery charger cradle so as to recharge a battery by means of the induction coil, and particularly relates to a battery pack which is placed, instead of a size AA battery, in a battery storage of an electronic device having been designed to load a plurality of size AA batteries in a mutually parallel relationship.

2. Description of the Related Art

There has been developed a structure for a battery to be recharged by electric power being carried from a primary coil to an induction coil (a secondary coil) by the effect of electromagnetic induction. Refer to Japanese Patent Laid-Open Publication No. H09-63655 (1997) and Japanese Utility Model Registration No. U-3011829.

Described in Japanese Patent Laid-Open Publication No. H09-63655 (1997) is a structure in which the primary coil excited by a high-frequency power source is incorporated in a battery charger cradle and the induction coil electromagnetically coupled to the primary coil is incorporated in a battery pack. The battery pack also incorporates a circuit in which an alternating current induced in the induction coil is rectified and such rectified current is supplied to a battery to be recharged. In accordance with such structure, the battery pack is placed on the battery charger cradle so that the battery contained in the battery pack can be recharged in a non-contact state.

Also described in Japanese Utility Model Registration No. U-3011829 is a structure in which the battery is contained in the bottom of mobile electronic equipment and a secondary-side charging adaptor is provided subjacently to the battery so that the induction coil and charging circuit are incorporated in the secondary-side charging adaptor. Also described is a structure in which the primary coil electromagnetically coupled to the induction coil is provided to the battery charger cradle. The mobile electronic equipment coupled to the secondary-side charging adaptor is placed on the battery charger cradle, and the electric power is carried from the primary coil to the induction coil to recharge the battery contained in the mobile electronic equipment.

SUMMARY OF THE INVENTION

The structures disclosed in the above-described publications are distinctive in that since the battery is recharged by the electric power carried from the primary coil to the induction coil, the battery can be recharged in a non-contact state without an intervening contact point. However, the battery pack described in Japanese Patent Laid-Open Publication No. H09-63655 (1997) is useful only for a purpose-built electronic device which is designed to load the battery pack. In view of this aspect, the battery pack cannot be used instead of the size AA battery so as to be loaded in a battery storage for the electronic device that is designed to use the size AA battery. Regarding Japanese Utility Model Registration No. U-3011829, on the other hand, the battery incorporated in the electronic device is charged by the electric power carried from the primary coil to the induction coil which are electromagnetically coupled to each other, so that when a battery pack is loaded in the electronic device being so structured and designed as to use the size AA battery, the battery pack cannot be used instead of the size AA battery.

The present invention has been made with the object of remedying the above-mentioned drawbacks. It is an object of the present invention to provide a battery pack which, instead of the size AA battery, can be loaded in and used with the battery storage of the electronic device having been designed to load the size AA battery, and can also be used very conveniently by recharging the incorporated battery by means of the battery charger cradle.

Another object of the present invention is to provide a battery pack, having a compact profile, in which a plurality of size AAA batteries are incorporated and such incorporated size AAA batteries are recharged, while the battery pack can be loaded and used, instead of the size AA battery, in the battery storage having been designed to load the size AA battery.

In order to achieve the above-described objects, the battery pack of the present invention is constructed as follows.

The battery pack instead of the size AA battery 54B is loaded in a battery storage 61 of an electronic device 60 having a battery storage 61 for accommodating a plurality of size AA batteries 54B in a mutually parallel relationship. The battery pack includes: a battery casing 71 profiled to be detachably mounted to the battery storage 61 of the electronic device 60; a plurality of size AAA batteries 54A, being diametrically narrower than the size AA battery 54B, incorporated in the battery casing 71; a battery holder 72 disposing the plurality of size AAA batteries 54A in place in a mutually parallel relationship; and a circuit board 73 disposed in a layered state on the battery holder 72 and connected to the size AAA batteries 54A as well as receiving a supply of electric power from a battery charger cradle 10. The plurality of size AAA batteries 54A are accommodated in the battery casing 71 in a spaced-apart manner where a distance (d) between longitudinal axes of the size AAA batteries 54A is larger than a distance (D) between longitudinal axes of the size AA batteries 54B loaded in the battery storage 61 of the electronic device 60. Defined between the adjacent size AAA batteries 54A is a storage space 82 to allow for disposition of an electronic component 84 mounted on a circuit board 73. With the electronic component 84, mounted on the circuit board 73, being disposed in the storage space 82, the battery pack accommodates in the battery casing 71 the plurality of size AAA batteries 54A, the battery holder 72, and the circuit board 73 which are in a mutually layered state.

Since the above-structured battery pack instead of the size AA battery can be loaded and used in the battery storage having been designed to load the size AA battery for the electronic device, the battery pack is distinctive in that the battery pack can be used more conveniently than the size AA battery by repeated recharging operations in a state of being placed in the electronic device without being removed off the electronic device. Further, the above-described battery pack increases a charging capacity by incorporating the plurality of size AAA batteries, while the size AAA batteries being diametrically narrower than the size AA batteries are disposed at a larger distance between the longitudinal axes than the distance between the longitudinal axes of the size AA batteries. Since such battery pack enables the electronic component mounted on the circuit board to be disposed in the storage space defined between the adjacent size MA batteries, resulting in a compact profile, the battery pack also realizes the advantage that the battery pack instead of the size AA batteries can be mounted and used in the battery storage having been designed to load the size AA.

The battery pack of the present invention has an induction coil 51 electromagnetically coupled to a primary coil 21 of the battery charger cradle 10 to induce electric power for recharging the size AAA battery 54A, and the induction coil 51 is disposed in a layered state on a circuit board 73. Since the incorporated size AAA battery can be recharged by electric power induced to the induction coil being electromagnetically coupled to the primary coil, the battery pack can be so structured as to enable a recharging operation in a stable manner by way of non-contact charging operation, while the battery pack instead of the size AA battery can be loaded and used in the battery storage having been designed to load the size AA battery.

The battery pack of the present invention uses a nickel-hydrogen battery as the size AAA battery 54A. Since the nickel-hydrogen battery is used which enables a charging capacity with respect to a unit volume to be larger than an alkaline battery, the battery pack is distinctive in that while being used instead of the size AA battery, the battery pack realizes a charging capacity being no smaller than the size AA battery and thus the electronic device powered by the battery pack can be used over a longer period of time.

The battery pack of the present invention is so designed as to be loaded, instead of two pieces of size AA batteries 54B, in the electronic device 60 having the battery storage 61 accommodating two pieces of size AA batteries 54B in a mutually parallel relationship, and two pieces of size AAA batteries 54A are accommodated in a mutually parallel relationship in the battery casing 71.

Since the two pieces of size AAA batteries are used instead of the two pieces of size AA batteries, the battery pack is distinctive in that while using a size AAA secondary battery such as a nickel-hydrogen battery having a larger charging capacity, the battery pack realizes a charging capacity being no smaller than the size AA battery and thus the electronic device powered by the battery pack can be used over a longer period of time.

The battery pack of the present invention is so designed that a bracket 74 is disposed between the circuit board 73 and the induction coil 51 and that the induction coil 51 is disposed in place by means of the bracket 74. The battery pack is distinctive in that the induction coil can be disposed in place by means of the bracket.

Further, the battery pack of the present invention has a shield layer 75 disposed between the bracket 74 and the induction coil 51. The battery pack is distinctive in that the shield layer is disposed in place by means of the bracket so that the battery, the circuit board, etc. can be shielded and protected from the primary coil.

The battery pack of the present invention is so designed that the battery holder 72 has a fitting-in recess 72a for disposing the size AAA battery 54A in place on a battery-side surface facing the size AAA battery 54A. This structure enables the size AAA battery to be guided into the fitting-in recess of the battery holder, disposing the size AAA battery in place.

The battery pack of the present invention is so designed that the battery holder 72 has a peripheral wall 72b for fitting-in the circuit board 73 in place on a board-side surface facing the circuit board 73 and that the circuit board 73 is disposed inside the peripheral wall 72b. In the battery pack, the circuit board can be disposed in a precise position by means of the battery holder disposing the size AAA battery in place.

Further, in addition to the previously described configuration, the battery pack of the present invention has a rear surface plate 76 for closing an opening of the battery storage 61 in a state of being mounted to the electronic device 60, and incorporates the induction coil 51 inside the rear surface plate 76, with the surface of the rear surface plate 76 being of a curved surface. The induction coil 51 is wound in a shape that matches the curved surface of the rear surface plate 76 and is formed in a loop elongated in a longitudinal direction of the incorporated size AAA battery 54A.

The above and further objects of the present invention as well as the features thereof will become more apparent from the following detailed description to be made in conjunction with the accompanying drawings.

DETAILED DESCRIPTION OF THE INVENTION

Figure 1:
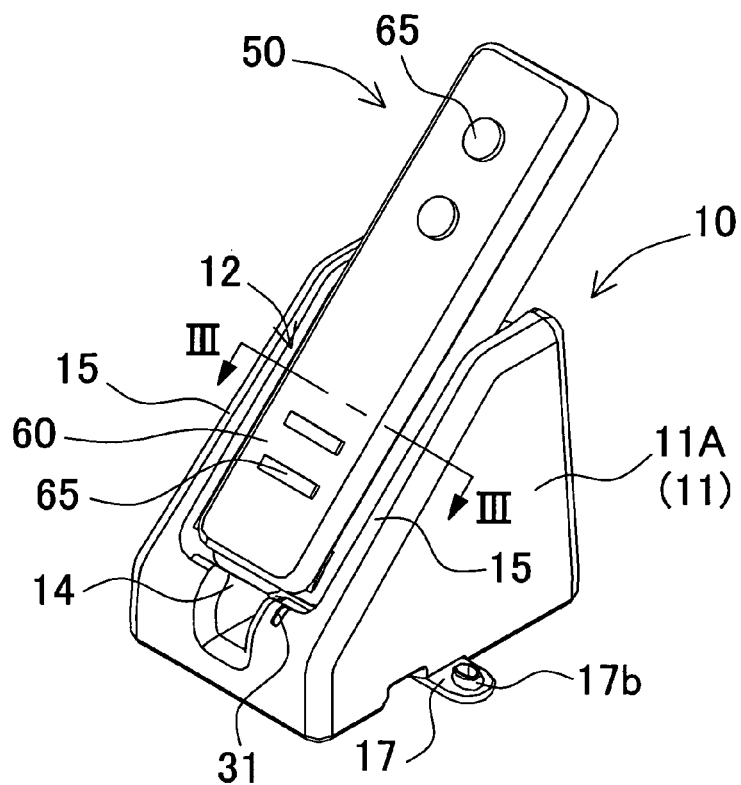
FIG. 1 is a perspective view showing that the mobile electronic equipment without being covered with a cover is placed on the battery charger cradle, the mobile electronic equipment being equipped with the battery pack in accordance with an embodiment of the present invention.
Figure 2:
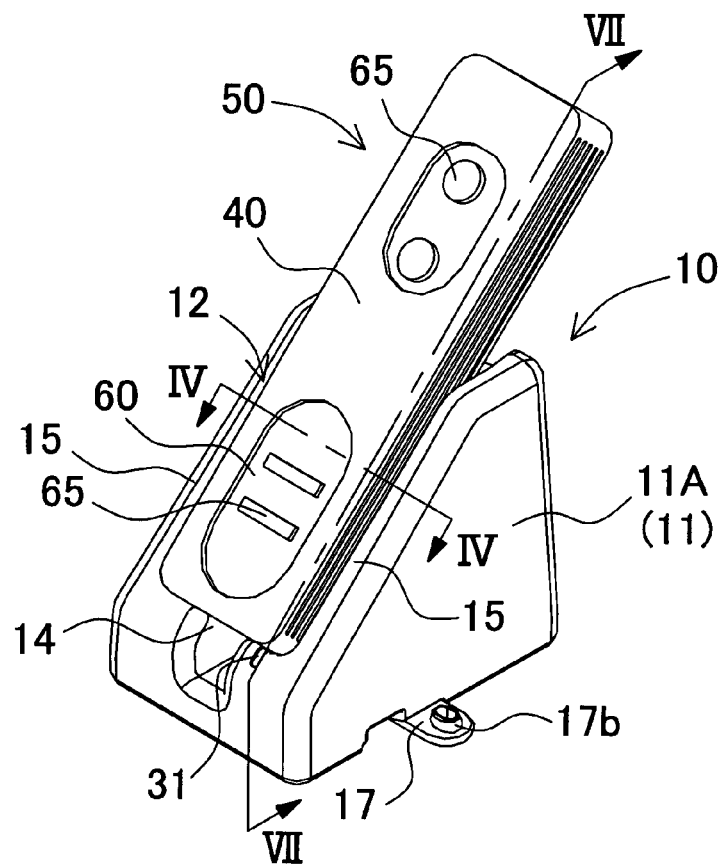
FIG. 2 is a perspective view showing that the mobile electronic equipment being covered with a cover is placed on the battery charger cradle, the mobile electronic equipment being equipped with the battery pack in accordance with an embodiment of the present invention.
Figure 3:
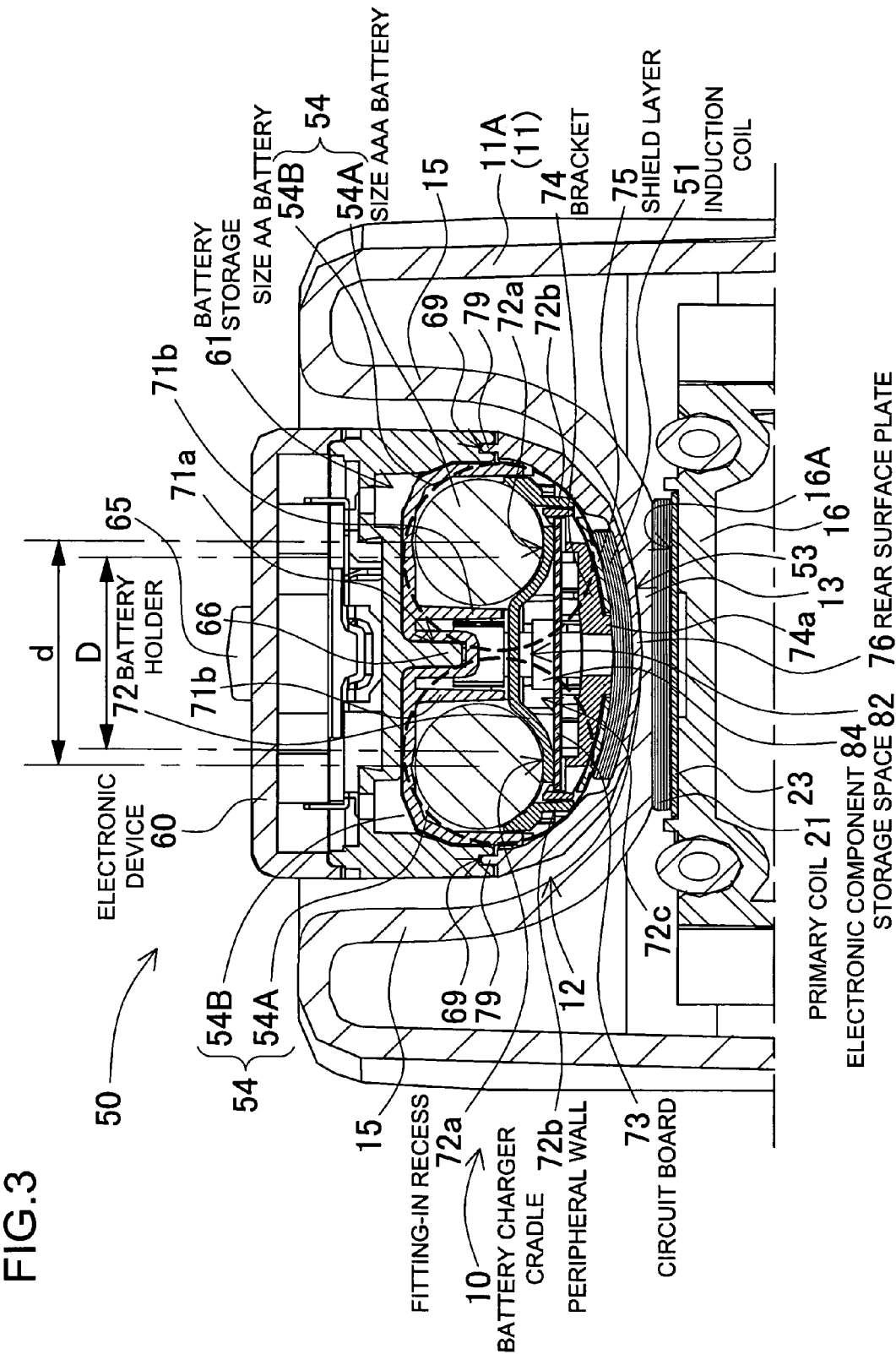
FIG. 3 is a sectional view taken along line of the mobile electronic equipment and the battery charger cradle shown in FIG. 1.
Figure 4:
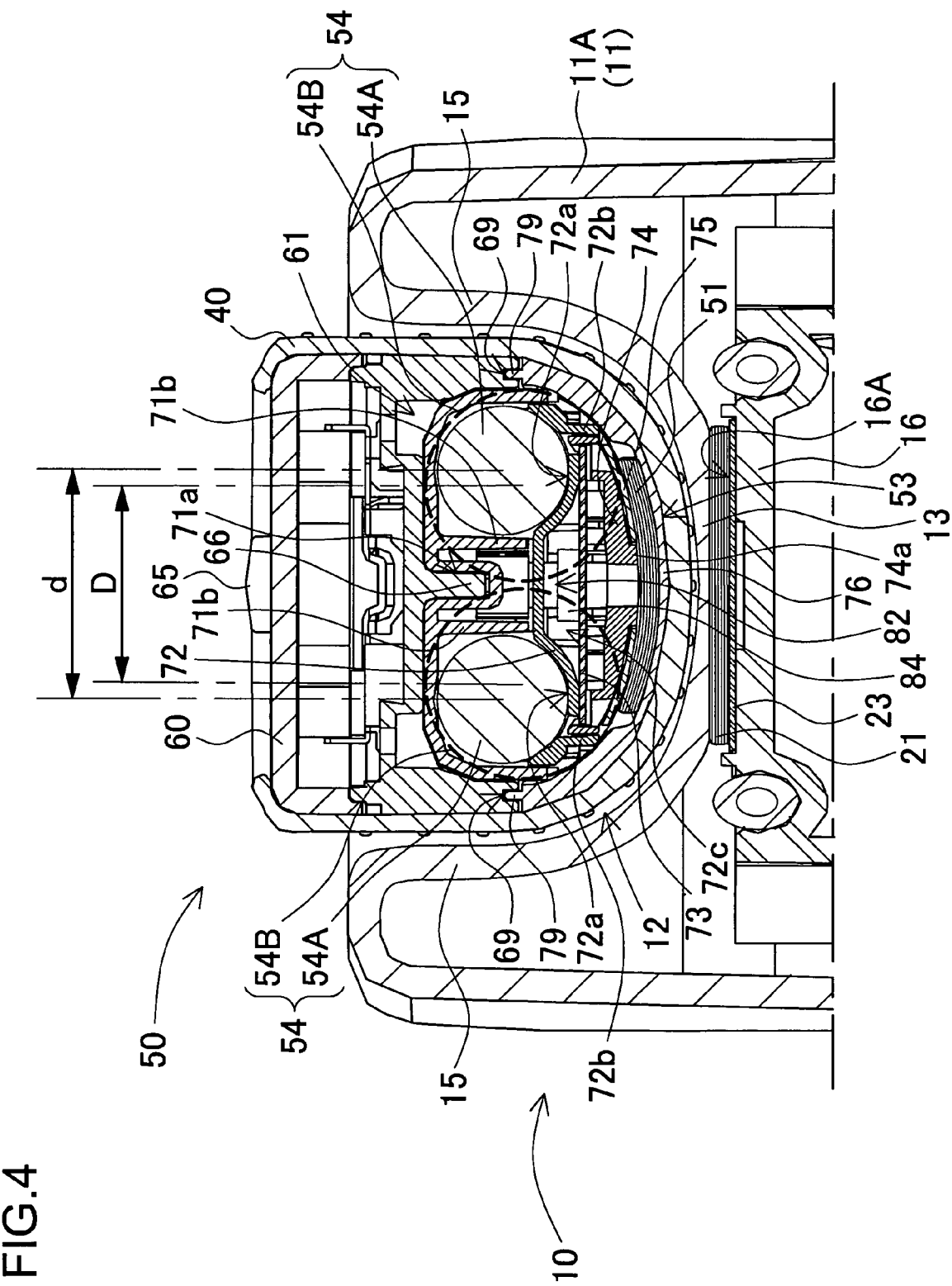
FIG. 4 is a sectional view taken along line IV-IV of the mobile electronic equipment and the battery charger cradle shown in FIG. 2.

FIG. 1 through FIG. 4 show a state where mobile electronic equipment 50 is placed on a mounting portion 12 of a battery charger cradle 10, the mobile electronic equipment 50 being equipped with a battery pack 70 in a battery storage 61 of an electronic device 60. FIG. 1 and FIG. 3 show a state where the mobile electronic equipment 50 without being covered with a cover is placed on the battery charger cradle 10, while FIG. 2 and FIG. 4 show a state where the mobile electronic equipment 50 being covered with a cover 40 is placed on the battery charger cradle 10. In the mobile electronic equipment 50 as shown in FIG. 3 and FIG. 4, the battery pack 70 instead of the cylindrical size AA battery 54B is placed at the battery storage 61 of the electronic device 60 for accommodating the cylindrical size AA battery 54B, the battery pack 70 incorporating an induction coil 51 and a battery 54, the battery 54 being recharged by electric power being electrically carried to the induction coil 51. The battery charger cradle 10 is designed so as to detachably support the mobile electronic equipment 50 on the mounting portion 12 of a casing 11 and recharge the battery 54 contained in the mobile electronic equipment 50. A useful example of the mobile electronic equipment in the present embodiment includes, but is not limited to, a remote controller for operating an electronic product such as an electronic gaming machine.

Figure 5:
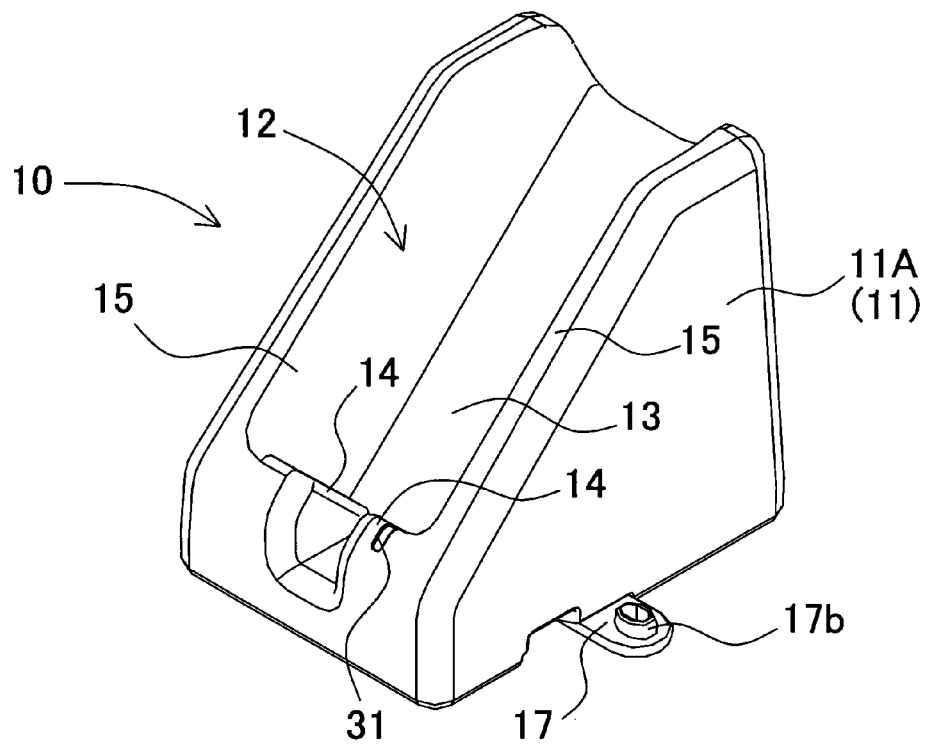
FIG. 5 is a perspective view of the battery charger cradle.

The battery charger cradle 10 shown in FIG. 3 through FIG. 5 has the mounting portion 12 defined by an upper casing 11A. The bottom surface of the mounting portion 12 is a curved bottom surface 13 that is curved in a U-grooved shape. In the mounting portion 12 at the upper casing 11A in the drawing, the longitudinal direction of the curved bottom surface 13 being U-grooved is postured so as to be inclined upwardly toward the rear direction, and a stopper wall 14 is provided at the bottom end. The mounting portion 12 has the shape of a U-groove in the cross section orthogonal to the longitudinal direction and serves to guide the mobile electronic equipment 50 to a precise position. The upper casing 11A has a pair of side walls 15 provided on either side of the mounting portion 12, and is fabricated of a plastic material formed so that the stopper wall 14 is located at the bottom end of the mounting portion 12.

Figure 6:
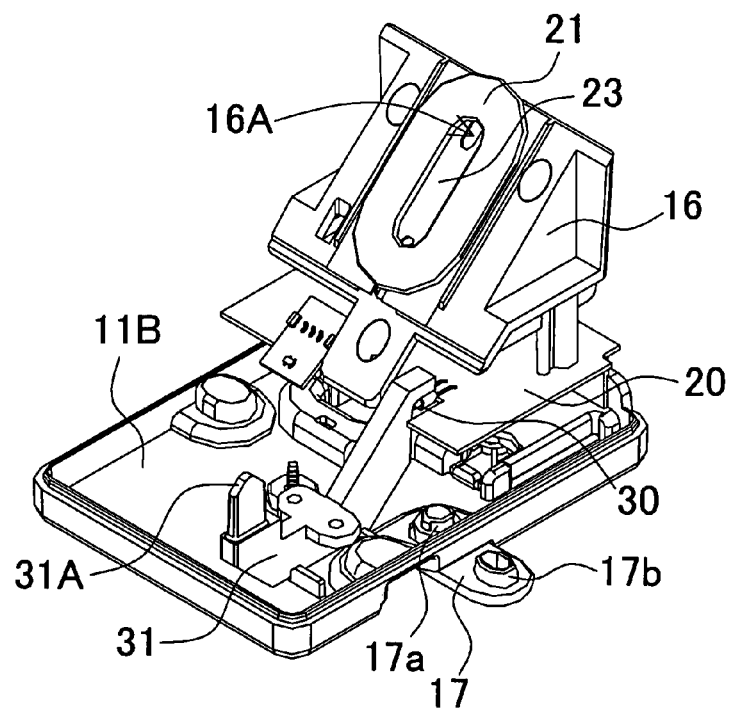
FIG. 6 is a perspective view of the battery charger cradle, shown in FIG. 5, with its upper casing having been removed.
Figure 7:
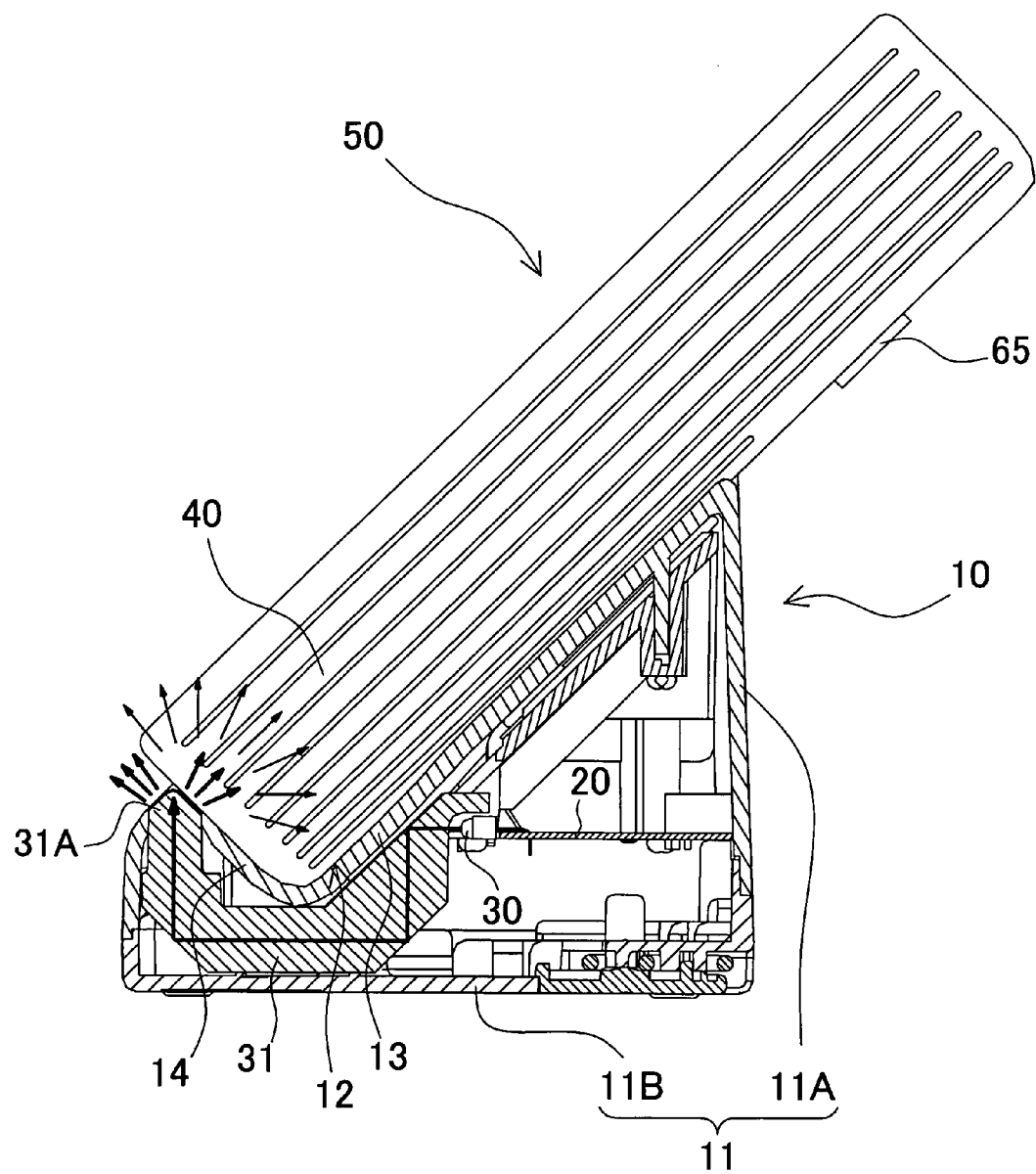
FIG. 7 is a sectional view taken along line VII-VII of the mobile electronic equipment and the battery charger cradle shown in FIG. 2.

To further describe the illustrated upper casing 11A, a light guide 31 is exposed on the stopper wall 14 for irradiating a light of an LED 30 to the outside. The light guide 31 is made of a translucent plastic material and is fixed to a lower casing 11B as shown in FIG. 6 and FIG. 7. The light guide 31 guides the light of the LED 30, disposed on a circuit board 20 fixed in the casing 11, to an exposure portion 31A at its tip, and the light is irradiated from the exposure portion 31A to the outside. The tip of the exposure portion 31A is exposed on an outer surface side of the stopper wall 14 and on an inner surface side of the stopper wall 14 (namely, toward the mounting portion 12), and the light emitted from the LED 30 is irradiated to the outer surface of the stopper wall 14 and to the inner surface of the stopper wall 14. The light emitted to the inner surface of the stopper wall 14 is irradiated onto the cover 40 of the mobile electronic equipment 50 to allow for a light emission at the cover 40 as shown in FIG. 7.

As shown in FIG. 3, FIG. 4 and FIG. 6, the battery charger cradle 10 has a primary coil 21 disposed inside the curved bottom surface 13 of the upper casing 11A. The primary coil 21 is a flat coil wound in a planar state and is disposed closer to the inner surface of the curved bottom surface 13. The primary coil 21 is wound in a loop that is elongated in the longitudinal direction of the U-shaped groove so as to enable the electric power to be carried to an area elongated along the longitudinal direction. The illustrated primary coil 21 is a coil in a planar state, but the primary coil can also be a flat coil where the opposite sides are of a curved surface matching with the curved bottom surface.

The primary coil 21 has a shield layer 23 provided at a side opposite to the induction coil 51, that is, subjacent to the primary coil 21 as viewed in the drawing. The shield layer 23 is a layer composed of metal or ferrite having high magnetic permeability and the layer shields the side of the primary coil 21 opposite to the induction coil 51. The shield layer 23 and the primary coil 21 are fixed to a plastic-made support platform 16 incorporated in the casing 11. The support platform 16 is fixed to the lower casing 11B so as to interpose the circuit board 20, and the shield layer 23 and the primary coil 21 are disposed in place at the casing 11. The support platform 16 has a slanted surface 16A matching the curved bottom surface 13, and the shield layer 23 and the primary coil 21 are fixed to the slanted surface 16A in a layered state.

Figure 8:
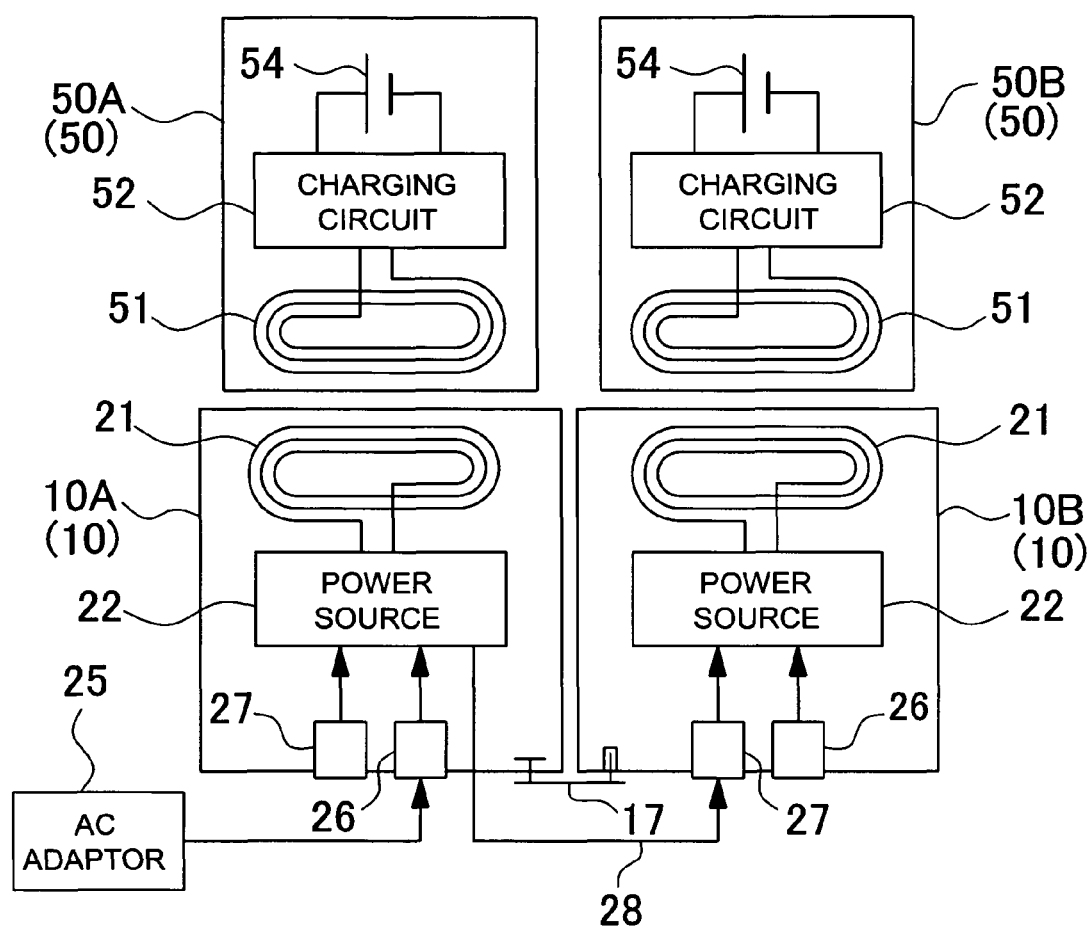
FIG. 8 is a circuit diagram of the mobile electronic equipment and the battery charger cradle, and showing a state in which a plurality of battery charger cradles are configured in use.

As shown in the circuit diagram in FIG. 8, the primary coil 21 is connected to a high-frequency power source 22 mounted on the circuit board 20. The high-frequency power source 22 converts DC power, fed from an AC adaptor 25, to high-frequency electric power, which is then supplied to the primary coil 21. The high-frequency power source 22 incorporates a circuit for interrupting an output of the high-frequency electric power when a battery 54 incorporated in the mobile electronic equipment 50 has been fully charged. A fully charged state of the battery 54 contained in the mobile electronic equipment 50 is detected by means of a charging circuit 52 incorporated in the mobile electronic equipment 50. The high-frequency power source 22, communicating with the charging circuit 52 in the mobile electronic equipment 50, can interrupt the output by detecting that the battery 54 of the mobile electronic equipment 50 has been fully charged.

Figure 9:
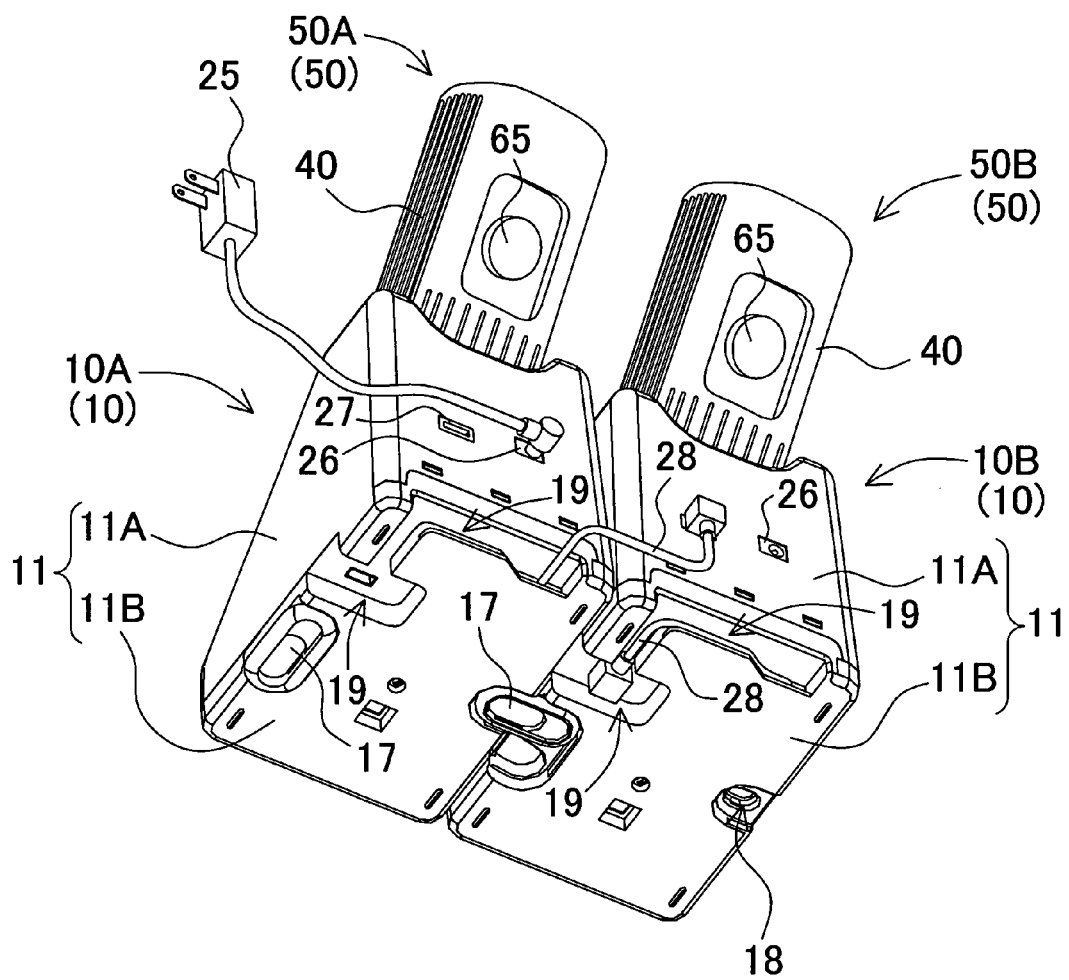
FIG. 9 is a rear perspective view showing a state in which a plurality of battery charger cradles are configured in use, as viewed from the bottom surface.

FIG. 9 shows a state where a plurality of battery charger cradles 10 are placed side by side to recharge the battery contained respectively in a plurality of mobile electronic devices 50. The battery charger cradle 10 used in such state has a connection portion 17 at a lateral side. The connection portion 17 allows the adjacent battery charger cradles 10 to be detachably interconnected. The connection portion 17 is connected to the bottom surface of the lower casing 11B such that the connection portion 17 can be retracted inside by pivotal motion of 90 degrees in a horizontal plane. The connection portion 17 is made of a plastic material and, as can be seen in FIG. 6, the connection portion 17 has at its first end a pivotal shaft 17a projecting upwardly to be connected pivotably to the lower casing 11B, while the connection portion 17 has at its second end a fitting-on protrusion 17b projecting upwardly to be guided into a fitting-in recess 18 defined at the lower casing 11B of the adjacent battery charger cradle 10. The lower casing 11B has at its bottom the fitting-in recess 18 to guide the fitting-on protrusion 17b of the connection portion 17 into the fitting-in recess 18. The connection portion 17, when not in use, is retracted inside so as not to project toward the adjacent battery charger cradle 10. When the battery charger cradles 10 are used side by side, the connection portion 17 is pivoted at 90 degrees; is drawn out of the lower casing 11B; allows the fitting-on protrusion 17b into the fitting-in recess 18 at the adjacent lower casing 11B; and interconnects the adjacent battery charger cradles 10.

FIG. 8 shows a circuit diagram of the high-frequency power source 22 incorporated in the battery charger cradle 10. The power source 22 receives a supply of electric power from a power source connector 26 which is inputted by the AC adaptor 25 and from an exterior inputting connector 27 which is inputted by the adjacent battery charger cradle 10. As shown in FIG. 9, the power source connector 26 and the exterior inputting connector 27 are fixed to the rear surface of the casing 11. Further, detachably accommodated in the bottom surface of the casing 11 is a power source cord 28 for supplying the electric power to the adjacent battery charger cradle 10. In order to accommodate the power source cord 28, a storage recess 19 is defined at the bottom surface of the casing 11 so as to allow the power source cord 28 to be fitted in the storage recess 19. The power source cord 28 is connected to the high-frequency power source 22.

In order to recharge the battery 54 contained in the mobile electronic equipment 50, the high-frequency power source 22 switches the electric power inputted from the power source connector 26 and the electric power inputted from the exterior inputting connector 27. That is to say, the primary coil 21 is thus excited. As shown in FIG. 8 and FIG. 9, in interconnecting a first battery charger cradle 10A and a second battery charger cradle 10B to recharge the battery 54 in first mobile electronic equipment 50A and the battery 54 in second mobile electronic equipment 50B, the following steps are carried out to recharge the batteries 54 contained in the two units of mobile electronic equipment 50.

(1) The first battery charger cradle 10A is connected to the AC adaptor 25 to supply DC power from the AC adaptor 25 to the power source 22 of the first battery charger cradle 10A. The power source 22 of the first battery charger cradle 10A excites the primary coil 21 by means of the DC power inputted from the AC adaptor 25 and recharges the battery 54 contained in the first mobile electronic equipment 50A. In this state, the power source 22 of the first battery charger cradle 10A does not output electric power through the power source cord 28.

(2) When the battery 54 contained in the first mobile electronic equipment 50A has been fully charged, the power source 22 of the first battery charger cradle 10A stops exciting the primary coil 21, and the DC power is outputted through the power source cord 28 to the second battery charger cradle 10B.

(3) The power source 22 of the second battery charger cradle 10B excites the primary coil 21 by means of the DC power inputted through the power source cord 28 (namely, by means of the DC power inputted from the exterior inputting connector 27) and recharges the battery 54 contained in the second mobile electronic equipment 50B. When the battery 54 contained in the second mobile electronic equipment 50B has been fully charged, the power source 22 of the second battery charger cradle 10B stops exciting the primary coil 21, and then the recharging operation of the battery 54 is completed.

As described above, the circuit configuration for sequentially recharging the batteries 54 contained in a plurality of mobile electronic devices 50 can fully charge the batteries 54 contained therein, without increasing the electric power which is inputted from the AC adaptor 25.

Figure 10:
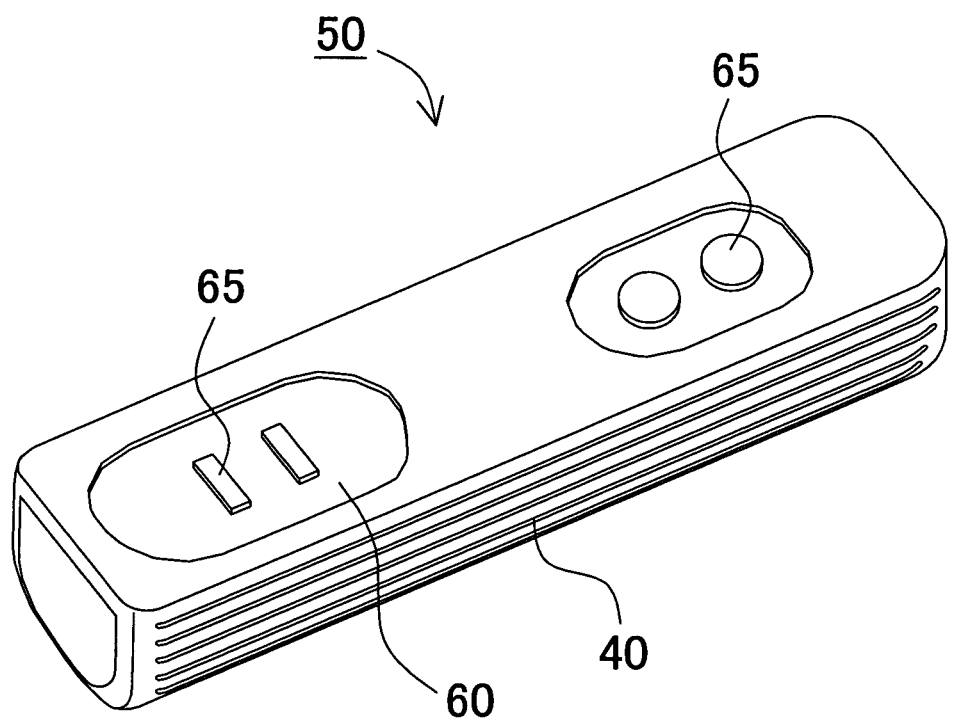
FIG. 10 is a perspective view of the mobile electronic equipment being covered with a cover.

The mobile electronic equipment 50 is equipped with the battery pack 70 in the battery storage 61 of the electronic device 60, the battery pack 70 incorporating a rechargeable secondary battery instead of the size AA battery 54B being a primary battery which is not rechargeable. As shown in FIG. 3 and FIG. 4, the mobile electronic equipment 50 equipped with the battery pack 70 on the rear surface of the electronic device 60 is so designed that, to be placed on the mounting portion 12 of the battery charger cradle 10, the rear surface is the curved rear surface 53 which is curved in a shape matching with the curved bottom surface 13, which is U-grooved, and the induction coil 51, which is wound on a curved surface matching with the curved rear surface 53, is incorporated inside the curved rear surface 53. FIG. 10 is a perspective view showing the mobile electronic equipment 50 covered with the detachable cover 40. A portion exposed in the cover 40 is an operation portion 65 such as a switch provided on the casing surface of the electronic device 60 of the mobile electronic equipment 50, and a surface devoid of the operation portion 65 is covered. Since the illustrated mobile electronic equipment 50 is provided with the operation portion 65 such as a switch partially on the frontal and rear surfaces, the mobile electronic equipment 50 is covered: in a generally overall surface except for the upper switch portion on the rear surface of the mobile electronic equipment 50 devoid of the operation portion 65; in a circumferential surface composed of lateral sides and top and bottom sides; and in the periphery of the frontal surface. The cover 40 is adapted to cover the mobile electronic equipment 50 in close contact with its surface by way of elastic contraction. The cover 40 is also adapted to cover the mobile electronic equipment 50 in a detachable manner by way of contraction and expansion. The mobile electronic equipment 50, in a state of being or not being covered with the cover 40, is placed on the mounting portion 12 of the battery charger cradle 10 to recharge the incorporated battery 54. The cover 40 is made of a stretchable soft plastic material, natural rubber or synthetic rubber to protect the mobile electronic equipment 50 from a shock due to a drop or collision. As shown in FIG. 1 and FIG. 2, the mobile electronic equipment 50 covered or not covered with the cover 40 is placed on the mounting portion 12 of the battery charger cradle 10, with the vertical longitudinal direction being postured to be inclined upwardly toward the rear side, in a posture with the equipment's bottom end being engaged on the stopper wall 14.

Figure 11:
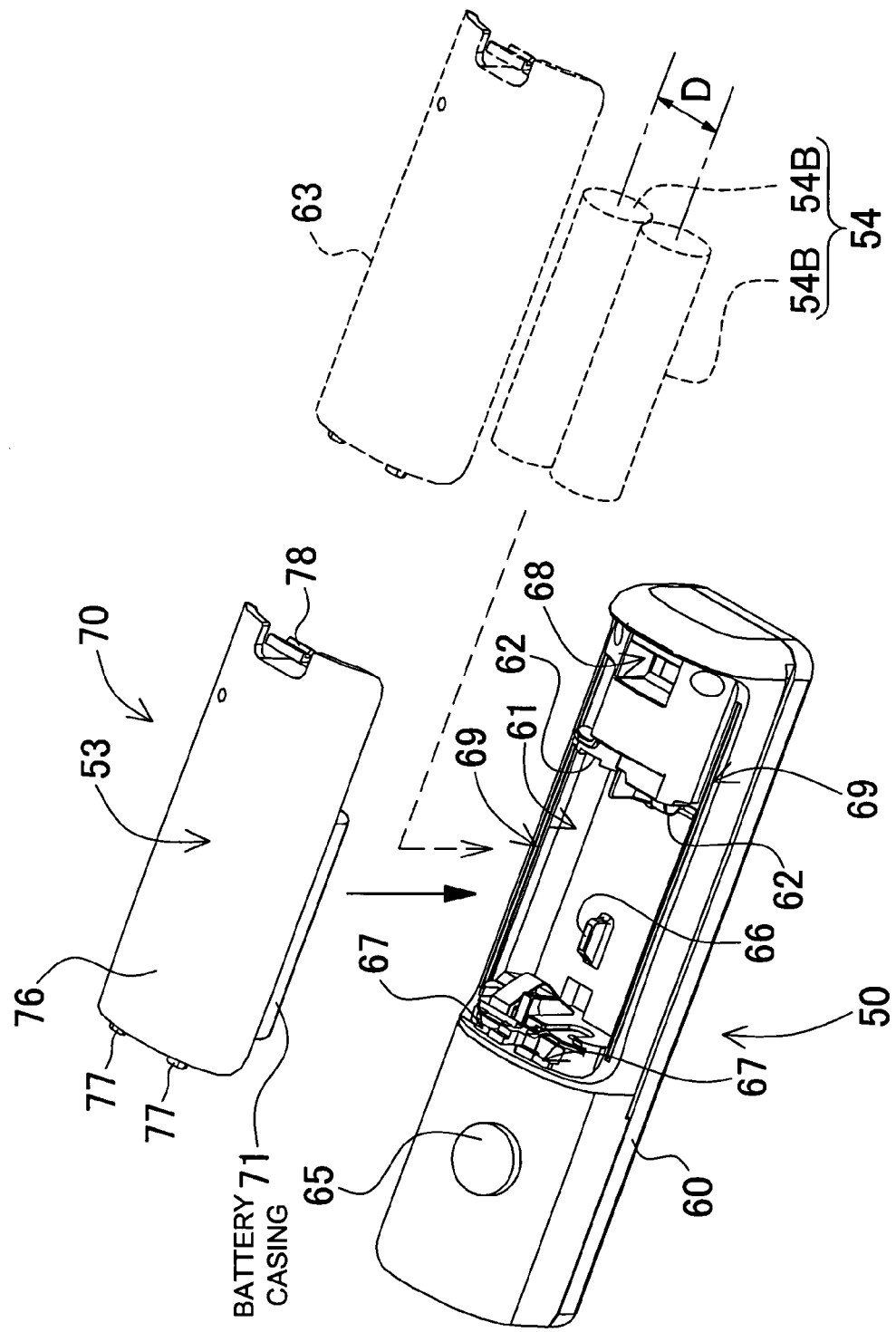
FIG. 11 is an exploded perspective view showing a state in which the battery pack in accordance with an embodiment of the present invention is removed from the mobile electronic equipment.

Inside the curved rear surface 53 of the battery pack 70 being equipped on the rear surface of the electronic device 60, the mobile electronic equipment 50 incorporates the induction coil 51 wound on the curved surface matching the curved rear surface 53. The mobile electronic equipment 50 shown in FIG. 3, FIG. 4 and FIG. 11 includes: the electronic device 60 having the battery storage 61 for accommodating a plurality of cylindrical batteries 54 in a mutually parallel relationship; and a battery pack 70 detachably placed in the battery storage 61 of the electronic device 60. The electronic device 60 has the battery storage 61 with its rear surface being opened, the battery pack 70 is placed in the battery storage 61, and the opening is closed. The illustrated mobile electronic equipment 50 incorporates the battery 54 and the induction coil 51 in the battery pack 70, and the induction coil 51 is accommodated inside the curved rear surface 53. As indicated by the dashed lines in FIG. 3, FIG. 4 and FIG. 11, the battery storage 61 of the electronic device 60 is shaped such that a plurality of size AA batteries 54B (two pieces of batteries in the drawing) can be received in a mutually parallel relationship. Instead of the plurality of size AA batteries 54B (two pieces of batteries in the drawing), the battery pack 70 can be detachably received in the battery storage 61. As shown in FIG. 11, either of the size AA batteries 54B or the battery pack 70 can be conveniently used with the mobile electronic equipment 50 thus structured. As indicated by dashed line in FIG. 11, the electronic device 60 closes the opening by means of a removable lid 63 in a state where the size AA batteries 54B are loaded in the battery storage 61. The removable lid 63 is removably connected to the opening of the battery storage 61. In a state where the removable lid 63 is removed and the size AA batteries 54B are loaded in the battery storage 61, the removable lid 63 is connected to the electronic device 63 and the opening of the battery storage 61 is closed.

Figure 12:
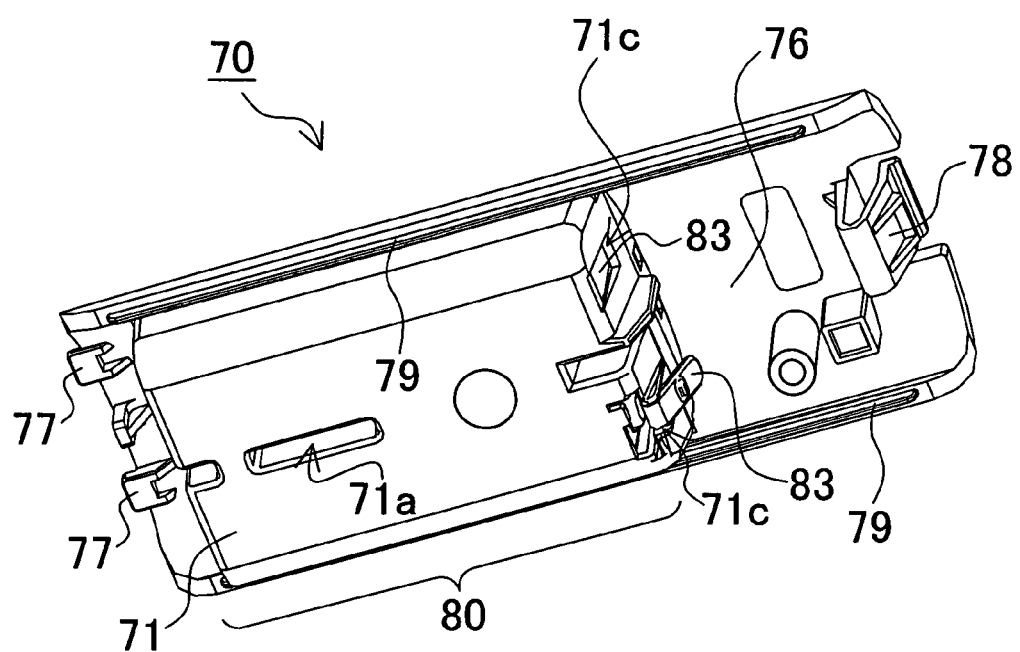
FIG. 12 is a bottom perspective view of the battery pack shown in FIG. 11.
Figure 13:
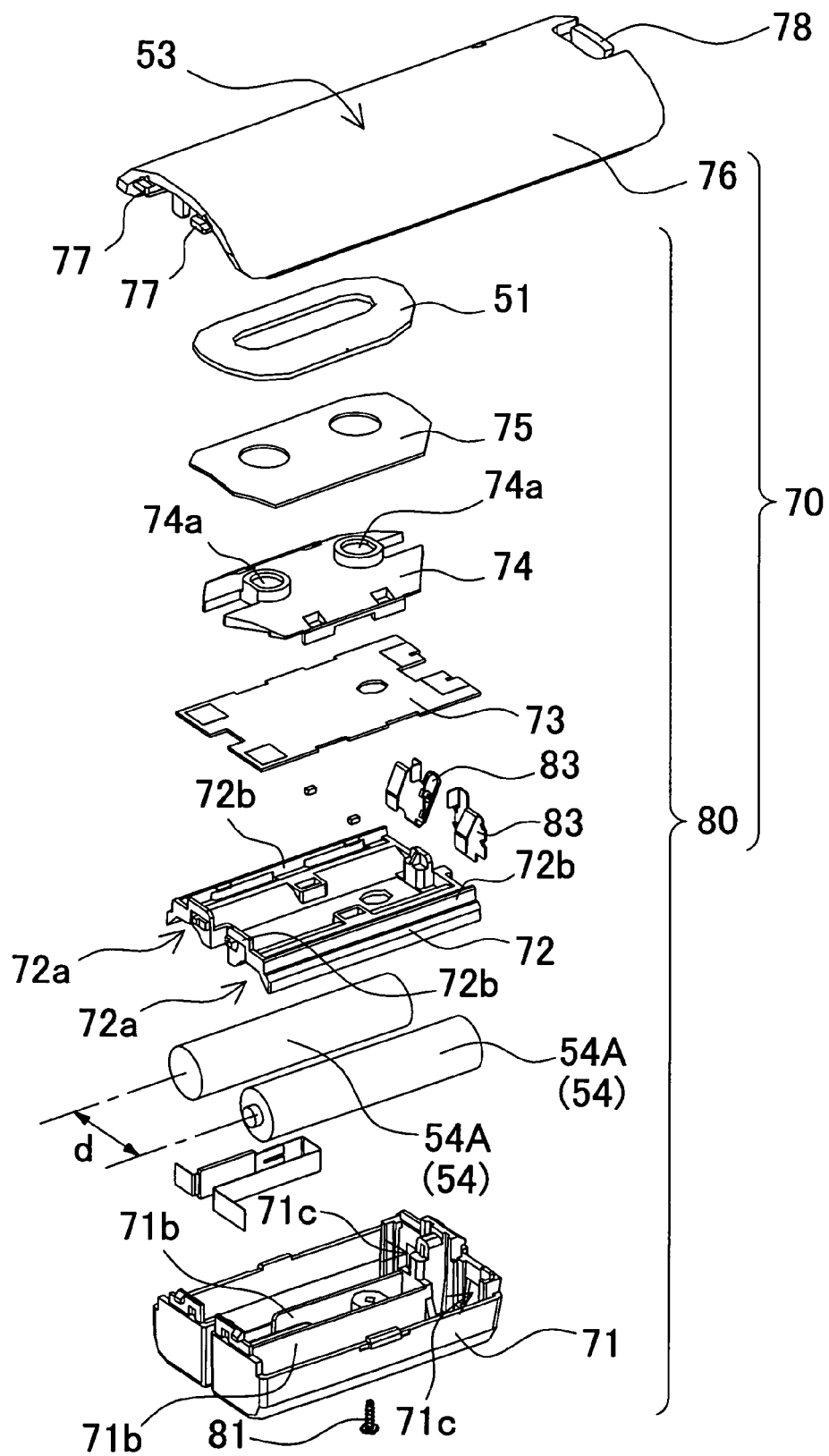
FIG. 13 is an exploded perspective view of the battery pack shown in FIG. 12.

When the removable lid 63 is removed, the battery pack 70 is placed in the battery storage 61. The battery pack 70 placed in the battery storage 61 is provided integrally with the removable lid. Thus, when the battery pack 70 is placed in the battery storage 61, the opening is closed. The battery pack 70 is shown in FIG. 12 and FIG. 13. FIG. 13 is an exploded perspective view of the battery pack 70 shown in FIG. 12. Further, FIG. 3 and FIG. 4 are sectional views showing a state where the mobile electrical equipment 50 is placed on the battery charger cradle 10. The battery pack 70 shown in these drawings includes: a battery casing 71 accommodating the battery 54; two pieces of size AAA batteries 54A accommodated in a battery casing 71; a battery holder 72 for positioning the size AAA batteries 54A in place; a circuit board 73 disposed in a layered state on the battery holder 72 to be connected to the battery 54; a bracket 74 disposed in a layered state on the circuit board 73; a shield layer 75 disposed on the bracket 74; an induction coil 51 disposed on the shield layer 75; and a rear surface plate 76 disposed on the induction coil 51. The rear surface plate 76, the bracket 74 and the battery holder 72 are fabricated by forming an (electrically) insulating plastic material.

The rear surface plate 76 is formed in a curved surface that matches with the curved rear surface 53 of the electronic device 60, with its outer and inner surfaces being of a curved surface. Since the illustrated rear surface plate 76 is used instead of the removable lid 63 of the battery storage 61, the plate is so profiled that the opening of the battery storage 61 can be closed, that is to say, the plate is formed in the same shape as the removable lid 63. The illustrated battery pack 70 is connected via the rear surface plate 76 to the battery storage 61 of the electronic device 60. The rear surface plate 76 has an engagement hook 77 integrally formed at the top end (at the lower left portion as viewed in FIG. 12) so as to be attachable to and detachable from the opening of the battery storage 61, and the rear surface plate 76 has an elastic hook 78 integrally formed at the bottom end (at the upper right portion as viewed in FIG. 12). The elastic hook 78 is engaged to the opening of the battery storage 61. The battery storage 61 has an engagement recess 67, 68 to be respectively engaged with the engagement hook 77 and the elastic hook 78 respectively at the upper and lower ends of the battery storage 61. The battery pack 70 is so designed that the engagement hook 77 is pushed onto the battery storage 61 in a manner of being hooked to the engagement recess 67, while the elastic hook 78 is engaged to the engagement recess 68 to be set with the battery storage 61 in a manner of not being disengaged. When the elastic hook 78 is elastically deformed to be removed from the engagement recess 68, the battery pack 70 can be removed from the electronic device 60. Further, the rear surface plate 76, shown in the sectional views in FIG. 3 and FIG. 4 has, at the center portion of opposite edges, a ridge 79 extending in the longitudinal direction. The ridge 79 is placed in a guide groove 69 provided at either side of the opening of the battery storage 61 provided at the electronic device 60, and the rear surface plate 76 is securely connected to the opening.

The induction coil 51 is disposed on the inner surface of the rear surface plate 76. The induction coil 51 is a flat coil winding a copper wire in a flat state, the copper wire being a metal that is coated on its surface with an insulating film. The coil is deformed into a shape matching the curved surface of the inner surface of the rear surface plate 76 and is disposed adjacent to the curved surface of the rear surface plate 76. The induction coil 51 is formed in a loop that is elongated in the longitudinal direction of the mobile electronic equipment 50 (namely, in the longitudinal direction of the size AAA battery 54A) such that the induction coil 51 can be electromagnetically coupled to the primary coil 21 in an efficient manner.

The shield layer 75 is layered on the lower surface of the induction coil 51 to magnetically shield the circuit board 73 and the battery 54 from the primary coil 21. The shield layer 75 is a layer such as metal and ferrite with high magnetic permeability, serving to prevent the high frequency generated by the primary coil 21 from adversely affecting the circuit board 73, the battery 54, etc. The shield layer 75 is curved in a shape matching with the induction coil 51 and is disposed adjacent to the rear surface of the induction coil 51.

The bracket 74 is made of a plastic material, and its surface facing the rear surface plate 76 is formed in a curved surface matching the rear surface plate 76. The bracket 74 defines a curved gap between its surface and the inner surface of the rear surface plate 76, and the induction coil 51 and the shield layer 75 are fixed inside the gap in an interposed state. The bracket 74 is formed with its rear surface being planar, the rear surface facing the circuit board 73, or is formed in a shape defining a recess for guiding an electronic component mounted on the circuit board 73, and the bracket 74 is fixed to the circuit board 73 in a layered state. Further, the bracket 74 has a positioning protrusion 74a for disposing the induction coil 51 in place, the positioning protrusion 74a being integrally formed on the surface of the bracket 74. The positioning protrusion 74a is guided into an inner hole of the elongated induction coil 51 to dispose the induction coil 51 in place. As can be seen in FIG. 13 illustrating the bracket 74, two pieces of positioning protrusions 74a are spaced apart from each other in the longitudinal direction of the inner hole in the elongated induction coil 51 so as to be positioned at opposite ends of the hole, and thus the induction coil 51 is positioned in place. Further in the bracket 74, the portions where the positioning protrusions 74a exist are formed so as to be thicker so that they can be concomitantly used as a screw-fitting boss for fixing the battery casing 71. To further describe the bracket 74, the battery casing 71 can be fixed to the bracket 74 when a set screw 81 extending through the battery casing 71 is screw-threaded into each of the positioning protrusions 74a of the bracket 74.

Mounted on the circuit board 73 is an electronic component 84 that realizes a charging circuit (not shown) for recharging the battery 54 by means of the electric power induced to the induction coil 51. The charging circuit recharges the battery 54 by converting the high-frequency electric power, induced to the induction coil 51, to DC with which the battery 54 can be recharged. In the circuit board 73, the mounted electronic component 84 is fixed on the bottom surface shown in FIG. 13 (on a top surface shown in FIG. 3 and FIG. 4), namely, on the battery side.

The battery holder 72 is shaped to support a plurality of size AAA batteries 54A (two pieces of batteries in the drawing) in place as well as supporting the circuit board 73 in place. The battery holder 72 is made of a plastic material and formed in a shape defining a fitting-in recess 72a for the battery 54 on a surface facing the battery. Since the illustrated battery pack 70 incorporates two pieces of size AAA batteries 54A, the fitting-in recess 72a shaped to match with the cylinder of the size AAA batteries 54A is defined in two parallel rows. Instead of the size AA battery 54B indicated by dashed line in FIG. 3 and FIG. 4, the size AAA battery 54A in the battery pack 70 is loaded in the battery storage 61. Since the size AAA battery 54A is diametrically smaller than the size M battery 54B, as can be seen in FIG. 3 and FIG. 4, the center positions of the size AAA batteries 54A are disposed in a lateral separation toward either side as compared with the size M batteries 54B which are loaded in the battery storage 61 so as to define a wider gap between the batteries, and a storage space 82 is defined in such gap for disposing the electronic component 84 mounted on the circuit board 73. That is to say, the size AAA batteries 54A are accommodated in the battery casing 71 in a spaced-apart manner where a distance (d) between longitudinal axes of the size AAA batteries 54A is larger than a distance (D) between longitudinal axes of the size AA batteries 54B. The storage space 82 is disposed with the electronic component 84 mounted on the circuit board 73 and is defined between the adjacent size AAA batteries 54A. The electronic component 84 mounted on the circuit board 73 is disposed in the storage space 82. The size AAA batteries 54A are disposed toward the outer sides to the largest possible extent to define the wider storage space 82 between the batteries.

The battery holder 72 has a peripheral wall 72b integrally formed on a board-side surface facing the circuit board 73, with the peripheral wall 72b fitting the circuit board 73 in place. The circuit board 73 is fitted inside the peripheral wall 72b to be fixed in place. Further, the battery holder 72 has a recess 72c defined on the board-side surface to guide the electronic component 84 fixed to the circuit board 73. The recess 72c is defined between the adjacent batteries 54, and the storage space 82 defined between the batteries 54 is effectively used for accommodating the electronic component 84.

The battery casing 71 is of a plastic-made box that is able to accommodate a plurality of size AAA batteries 54A (two pieces of batteries in the drawing) inside, with the opening of the box being connected to the rear surface plate 76. The box-shaped battery casing 71 is fabricated by connecting the opening edge to the rear surface plate 76 in a fitting-on engagement structure or by a welded connection, with the opening being closed by the rear surface plate 76. The battery casing 71 shown in the sectional views in FIG. 3 and FIG. 4 has, at its bottom surface, a guide groove 71a defined for guiding a separation wall 66 provided in the battery storage 61. The separation wall 66 is provided between the batteries 54 to accommodate the size AA batteries 54B in place. Further, the battery casing 71 has a retention rib 71b integrally formed at opposite sides of the guide groove 71a, the retention rib 71b for retaining the size AAA batteries 54A in place. The battery casing 71 contains the size AAA batteries 54A between the retention rib 71b and the opposing side walls to retain the batteries in place. Further, the battery casing 71 has a terminal window 71c opened to expose an output terminal 83 to the outside, so that the output terminal 83 is exposed through the terminal window 71c to the outside. The output terminal 83 of the battery pack 70 contacts a power source terminal 62 provided at the battery storage 61 and allows the electric power to be supplied to the electronic device 60. The power source terminal 62 is disposed in a position of contacting an electrode of the size AA battery 54B accommodated in the battery storage 61. Therefore, the battery pack 70 is accommodated instead of the size AA battery 54B, and the electric power is supplied from the battery pack 70 to the electronic device 60.

The above-described battery pack 70 is assembled in the following steps.
(1) The size AAA battery 54A is accommodated in the battery casing 71, and the battery holder 72 is disposed on the size AAA battery 54A to hold the size AAA battery 54A in place.
(2) The circuit board 73 and the bracket 74 are stacked with the battery holder 72, and further the induction coil 51 is layered on the bracket 74 via the shield layer 75 to dispose the induction coil 51 in place on the bracket 74. In such state, the circuit board 73, the size AAA battery 54A and the induction coil 51 are interconnected, and the output terminal 83 connected to the circuit board 73 is disposed inside the terminal window 71c of the battery casing 71.
(3) The set screw 81 extending through the battery casing 71 is screw-threaded into the positioning protrusion 74a at the bracket 74, and the bracket 74 is fixed to the battery casing 71 to thus make up a battery assembly 80.
(4) The opening edge of the battery casing 71 is fixed to the rear surface plate 76, and the battery assembly 80 is fixed to the rear surface plate 76.

In the mobile electronic equipment and the battery charger cradle provided with the above-described structure, the mobile electronic equipment 50 is covered with the detachable cover 40, and the mounting portion 12 of the battery charger cradle 10 is internally profiled to enable the mobile electronic equipment 50 covered with the cover 40 to be placed on the mounting portion 12 of the battery charger cradle 10. The mobile electronic equipment and the battery charger cradle of this structure guide the mobile electronic equipment 50, whether or not being covered with the cover 40, to a prescribed position of the mounting portion 12, and the battery 54 contained in the mobile electronic equipment 50 can be efficiently recharged, with the induction coil 51 being brought closer to the primary coil 21.

As shown in FIG. 3, in a state in which the mobile electronic equipment 50 without being covered with the cover is properly disposed, a bottommost portion of the curved bottom surface 13 of the battery charger cradle 10 coincides with and contacts a bottommost portion of the curved rear surface 53 of the mobile electronic equipment 50. The curved bottom surface 13 of the battery charger cradle 10 and the curved rear surface 53 of the mobile electronic equipment 50 are in a bilaterally symmetrical structure, so that when the mobile electronic equipment 50 is placed on the mounting portion 12 of the battery charger cradle 10, the mobile electronic equipment 50 can slide down by the effect of its own weight into an appropriate position. And, when the curved bottom surface 13 of the battery charger cradle 10 and the curved rear surface 53 of the mobile electronic equipment 50 are made of a plastic material having a lower coefficient of friction, the mobile electronic equipment 50 can be disposed in an appropriate position in such a manner to permit it to slide down more easily.

Further, as shown in FIG. 4, even in a state where the mobile electronic equipment 50 is covered with the cover 40, when the curved rear surface 53 of the mobile electronic equipment 50 is placed on the curved bottom surface 13 of the battery charger cradle 10, alignment can be made easily in the following manner to carry out an efficient recharging operation.
(1) Alignment can be efficiently obtained when the bottommost portion of the curved bottom surface 13 of the battery charger cradle 10 and the bottommost portion of the curved rear surface 53 of the mobile electronic equipment 50 are disposed in a manner of matching with each other.
(2) Since the curved bottom surface 13 of the battery charger cradle 10 and the curved rear surface 53 of the mobile electronic equipment 50 are in a bilaterally symmetrical structure, correct alignment can be achieved if longitudinal axes of the cradle and the equipment are disposed in a manner of matching with each other.
(3) Correct alignment can be achieved when the frontal surface of the mobile electronic equipment 50 is disposed to be horizontal in a left-and-right direction.

Figure 14:
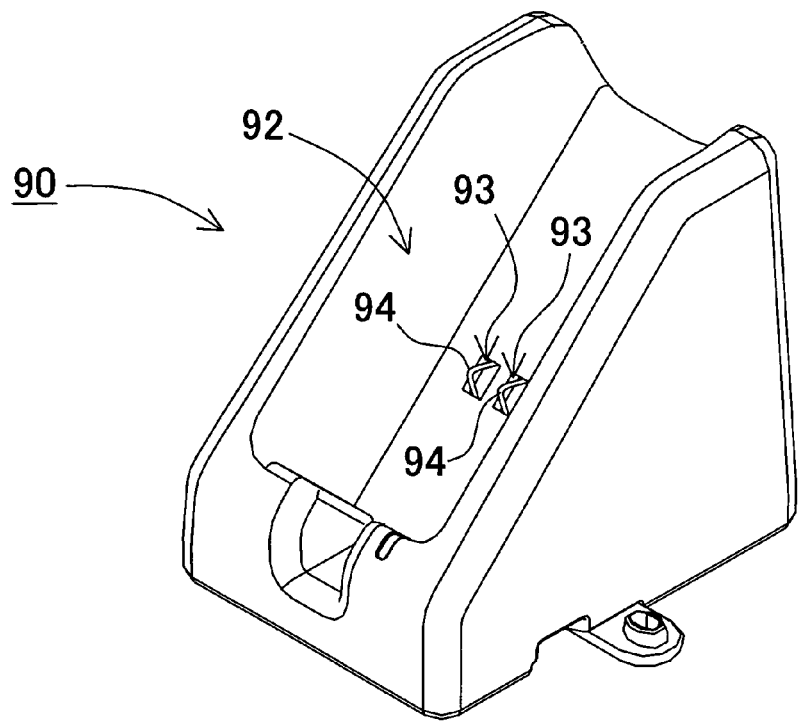
FIG. 14 is a perspective view of the battery charger cradle for recharging the mobile electronic equipment equipped with the battery pack in accordance with an alternative embodiment of the present invention.
Figure 15:
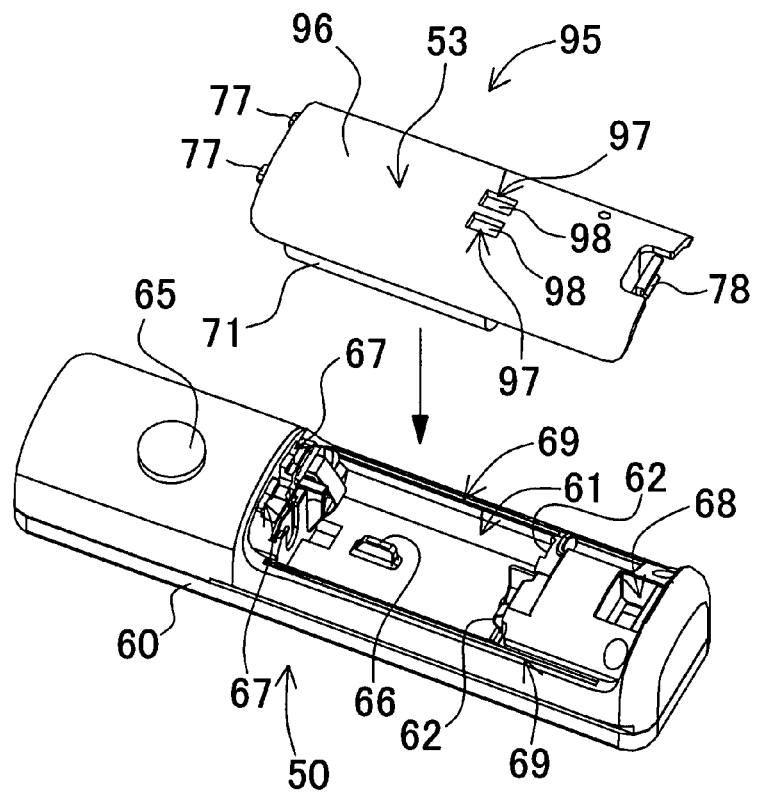
FIG. 15 is an exploded perspective view showing a state in which the battery pack in accordance with another embodiment of the present invention is removed from the mobile electronic equipment.

The battery pack 70 according to the above-described embodiment is structured so that the incorporated size AAA battery 54A is recharged by the electric power that is carried from the non-contact battery charger cradle 10 to the mobile electronic equipment 50 by the effect of electromagnetic induction. However, the battery pack of the present invention is also designed so that the incorporated battery is recharged by the electric power being supplied via a battery charger cradle having a contact point, without necessarily being recharged by the electric power carried by electromagnetic induction using the non-contact battery charger cradle. FIG. 14 shows a battery charger cradle 90 having a charging contact 94, and FIG. 15 shows the mobile electronic equipment 50 to be placed on a mounting portion 92 of the battery charger cradle 90. The battery charger cradle 90 shown in FIG. 14 has a contact window 93 opened at the mounting portion 92, with a charging contact 94 projecting from the contact window 93. The charging contact 94 is disposed at a position facing a power source terminal 98 provided on a rear surface of a battery pack 95 to be placed on the rear surface of the mobile electronic equipment 50 which is placed to the mounting portion 92. The mobile electronic equipment 50 shown in FIG. 15 has the battery pack 95 loaded detachably in the battery storage 61 disposed on the rear surface. The battery pack 95 has a terminal hole 97 opened at a rear surface plate 96, and a power source terminal 98 is exposed from the terminal hole 97. The power source terminal 98 is connected to a circuit board (not shown) incorporated in the battery pack 95, and the electric power supplied from the battery charger cradle 90 is supplied to the circuit board to recharge the incorporated battery. When the mobile electronic equipment 50 loaded with the battery pack 95 is placed on the mounting portion 92 of the battery charger cradle 90, the charging contact 94 projecting from the contact window 93 of the mounting portion 92 contacts the power source terminal 98 exposed on the rear surface of the battery pack 95, and thus the electric power is supplied from the charging contact 94 to the power source terminal 98. The battery pack 95 recharges the incorporated size AAA battery 54A by the electric power supplied from the battery charger cradle 90 via the charging contact 94 and the power source terminal 98.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The present application is based on Application No. 2008-114590 filed in Japan on Apr. 24, 2008, the content of which is incorporated herein by reference.

What is claimed is:

1. A battery pack that replaces AA batteries in an electronic device, wherein a battery compartment of the electronic device accepts a plurality of size AA batteries loaded in parallel orientation; wherein the battery pack comprises:
 a battery casing having an outline that allows insertion of the battery casing in a detachable manner in the battery compartment of the electronic device;
 at least one cylindrical battery housed in the battery casing, the at least one cylindrical battery being narrower than a size AA battery, the at least one cylindrical battery having an axial end surface and a side surface which is perpendicular to the axial end surface;
 a rear surface plate, integrally connected to the battery casing, for closing an opening of the battery compartment of the electronic device in a state of being mounted to the electronic device;
 a battery holder disposed between the rear surface plate and the at least one cylindrical battery, wherein the battery holder is in contact with the side surface of the at least one cylindrical battery so as to define a positioning of the at least one cylindrical battery;
 an induction coil arranged on the rear surface plate; and
 a circuit board that is disposed between the rear surface plate and the side surface of the at least one cylindrical battery, the circuit board being connected to the at least one cylindrical battery and receiving electric power by the action of electromagnetic induction from an external battery charger stand and charging the at least one cylindrical battery,
 wherein the battery holder comprises a first surface and a second surface being opposite to the first surface,
 wherein the at least one cylindrical battery is disposed on the first surface of the battery holder, and the induction coil is disposed between the rear surface plate and the second surface of the battery holder,
 and wherein the battery holder is arranged so as to divide a space in which the at least one cylindrical battery is disposed from a space in which the induction coil is disposed.

2. The battery pack as recited in claim 1, further comprising the induction coil being electromagnetically coupled to a primary coil of the battery charger stand to induce electric power for recharging the at least one cylindrical battery,
 wherein the induction coil is disposed in a layered state on the circuit board.

3. The battery pack as recited in claim 2, further comprising a bracket disposed between the circuit board and the induction coil, wherein the induction coil is disposed in place by means of the bracket.

4. The battery pack as recited in claim 2, further comprising a shield layer disposed on a rear surface of the induction coil.

5. The battery pack as recited in claim 2,
 wherein the rear surface plate is formed in a curved surface,
 wherein the induction coil is incorporated inside the rear surface plate, and
 wherein the induction coil is wound in a shape of matching with the curved surface of the rear surface plate.

6. The battery pack as recited in claim 5, wherein the induction coil is formed in a loop elongated in a longitudinal direction of the at least one cylindrical battery.

7. The battery pack as recited in claim 1, wherein the at least one cylindrical battery is a nickel-hydrogen battery.

8. The battery pack as recited in claim 1, wherein the battery compartment of the electronic device accepts two size AA batteries in a mutually parallel relationship,
 and wherein the at least one cylindrical battery comprises two cylindrical batteries, the two cylindrical batteries being accommodated in a mutually parallel relationship in the battery casing.

9. The battery pack as recited in claim 1, wherein the rear surface plate is formed with a curved surface matching with a curved rear surface of the electronic device.

10. The battery pack as recited in claim 1, wherein the rear surface plate has an engagement hook and an elastic hook integrally formed to be attachable to and detachable from the opening of the battery compartment.

11. The battery pack as recited in claim 1, further comprising the induction coil being electromagnetically coupled to a primary coil of the battery charger stand to induce electric power for recharging the at least one cylindrical battery, wherein the induction coil is incorporated inside the rear surface plate.

12. The battery pack as recited in claim 11, wherein the induction coil is wound in a shape of matching with the curved surface of the rear surface plate.

13. The battery pack as recited in claim 1, further comprising:
 a bracket disposed in a layered state on the circuit board, the bracket being made of an insulating material
 wherein the bracket is in contact with the induction coil so as to define a positioning of the induction coil such that the induction coil is in contact with an inner surface of the rear surface plate.

14. The battery pack as recited in claim 13, further comprising wherein the induction coil can be electromagnetically coupled to a primary coil of the battery charger stand to induce electric power for recharging the at least one cylindrical battery, wherein the induction coil is disposed between the bracket and the rear surface plate.

15. The battery pack as recited in claim 13, further comprising a shield layer that is disposed between the bracket and the induction coil.

16. The battery pack as recited in claim 13, wherein the induction coil can be electromagnetically coupled to a primary coil of the battery charger stand to induce electric power for recharging the at least one cylindrical battery, and wherein the bracket has, on a surface thereof, a positioning protrusion for disposing the induction coil in place, and the positioning protrusion is guided into an inner hole of the induction coil to dispose the induction coil in place.

17. The battery pack as recited in claim 13, wherein when a set screw extending through the battery casing is screw-threaded into the bracket, the battery casing is fixed to the bracket.

18. The battery pack as recited in claim 1, wherein the at least one cylindrical battery comprises two cylindrical batteries,
wherein the battery holder holds the cylindrical batteries in place in a mutually parallel relationship,
wherein the battery holder has a recess defined on a board-side surface to guide an electronic component fixed to the circuit board, the recess being defined between the cylindrical batteries,
and wherein the electronic component is disposed in a storage space defined between the cylindrical batteries.

19. The battery pack as recited in claim 1, wherein the at least one cylindrical battery is a size-AAA battery.

20. The battery pack as recited in claim 1, further comprising an electronic component, wherein the electronic component is mounted on the circuit board, on a battery side of the circuit board.

21. The battery pack as recited in claim 1, wherein the at least one cylindrical battery comprises two cylindrical batteries,
wherein the battery holder holds the cylindrical batteries in place in a mutually parallel relationship,
and wherein the cylindrical batteries, the battery holder, and the circuit board are accommodated in the battery casing in a layered state.

22. The battery pack as recited in claim 21, wherein the battery holder has a fitting-in recess for disposing the cylindrical batteries in place on a battery-side surface facing the cylindrical batteries.

23. The battery pack as recited in claim 21, wherein the battery holder fixedly fits the circuit board in place on a board-side surface facing the circuit board.

24. The battery pack as recited in claim 21, wherein the battery holder has a peripheral wall for fitting-in the circuit board in place on a board-side surface facing the circuit board and the circuit board is disposed inside the peripheral wall.

25. The battery pack as recited in claim 21, wherein the battery holder fixes the circuit board in position.

26. The battery pack as recited in claim 1, further comprising an electronic component mounted on the circuit board,
wherein the at least one cylindrical battery comprises two cylindrical batteries,
wherein the cylindrical batteries are accommodated in the battery casing in a spaced-apart manner where a distance (d) between longitudinal axes of the cylindrical batteries is larger than a distance (D) between longitudinal axes of the size AA batteries when loaded in the battery compartment of the electronic device,
and wherein a storage space is defined between the cylindrical batteries to allow for disposition of the electronic component mounted on the circuit board.

\* \* \* \* \*